No. 867,772.
PATENTED OCT. 8, 1907.
A. W. WARD.
MOLDER AND CUTTER FOR BUTTER AND ANALOGOUS SUBSTANCES.
APPLICATION FILED JAN. 31, 1907.
2 SHEETS—SHEET 1.
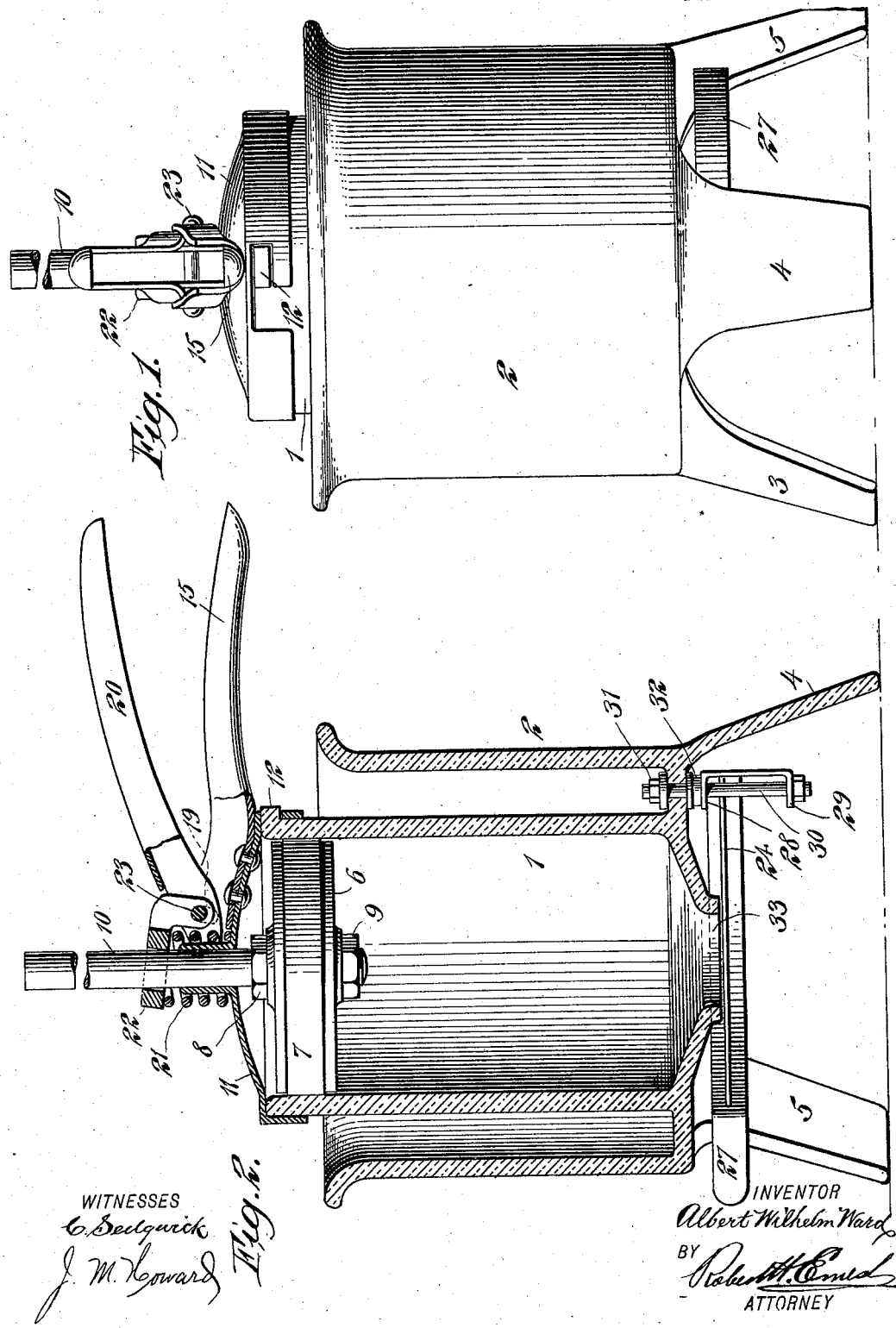
WITNESSES
INVENTOR
Albert Wilhelm Ward
BY
ATTORNEY No. 867,772. PATENTED OCT. 8, 1907.
A. W. WARD.
MOLDER AND CUTTER FOR BUTTER AND ANALOGOUS SUBSTANCES.
APPLICATION FILED JAN. 31, 1907.
2 SHEETS—SHEET 2.
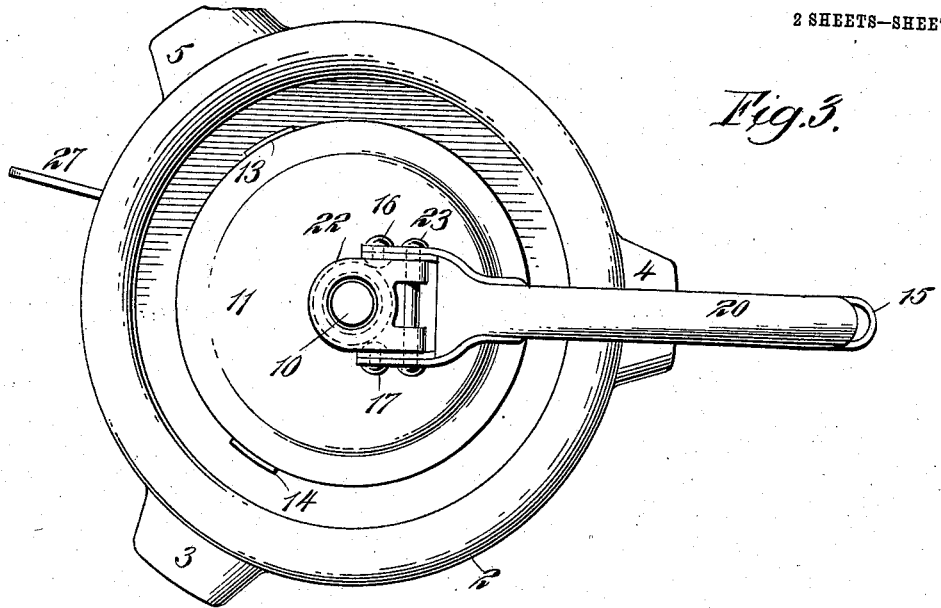
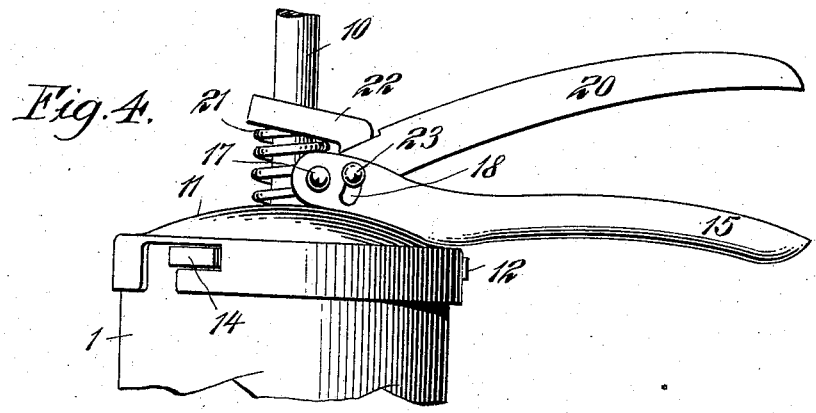
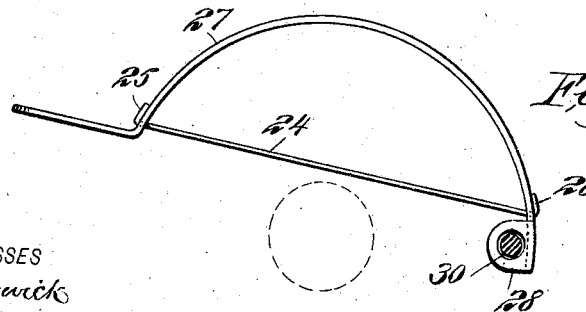
WITNESSES
INVENTOR
Albert Wilhelm Ward
BY
ATTORNEY

UNITED STATES PATENT OFFICE.

ALBERT WILHELM WARD, OF NEW YORK, N. Y.

MOLDER AND CUTTER FOR BUTTER AND ANALOGOUS SUBSTANCES.

No. 867,772.  Specification of Letters Patent.  Patented Oct. 8, 1907.

Application filed January 31, 1907. Serial No. 354,968.

*To all whom it may concern:*

Be it known that I, ALBERT WILHELM WARD, a subject of the King of Sweden, and a resident of the borough of Brooklyn, city of New York, in the county of Kings and State of New York, have invented certain new and useful Improvements in Molders and Cutters for Butter and Analogous Substances, of which the following, in connection with the accompanying drawings and the reference characters marked thereon, is a full, clear, and exact specification, sufficient to enable others skilled in the art to make and use my invention.

The object of this invention is to provide or produce a simple, cheap and efficient molder and cutter for butter and substances of like consistency, for use in hotels, restaurants and stores or for family use when so desired, which molder and cutter shall be of few and simple parts, easy to keep clean, embody facilities for keeping the material cool and serve to deliver the material in small cakes or pieces of practically uniform size and attractive appearance.

To accomplish all of the foregoing objects and to secure other and further advantages in the matters of construction, operation and use, my improvements involve certain new and useful arrangements or combinations of parts and peculiarities of construction as will be herein first fully described and then pointed out in the claims.

In the accompanying drawings forming part of this specification, Figure 1 is a front elevation and Fig. 2 is an axial section and elevation showing a device constructed and arranged for operation in accordance with my invention and involving my improvements. Fig. 3 is a top or plan view corresponding with Fig. 2. Fig. 4 is a side elevation showing a fragment of the top of the inner cylinder with the cover in place thereon. Fig. 5 is a plan view showing the construction and arrangement of the cutter employed for severing the cakes or pieces of the material below the discharge mouth of the apparatus.

In all these figures like reference characters, wherever they are employed, indicate corresponding parts.

The cylinder which receives the material to be molded and cut is represented at 1. Around this and at a little distance therefrom is a second cylinder, 2, which together with the first named cylinder incloses an annular space for the reception of ice or cold water or any cooling medium. These two cylinders are preferably formed together or in one piece and are by preference made of glass, but other material might be employed. The structure is provided with suitable legs, as at 3, 4 and 5, and these are preferably made integral with the two cylinders.

Fitting the interior of the cylinder 1 and movable up and down therein, is a piston, 6, which is packed by a rubber band or other suitable packing ring, represented at 7; and a piston rod, 10, is securely applied at the center of the piston and locked in connection therewith by suitable nuts, as at 8 and 9. A removable cover, 11, fits on the top of the cylinder 1 and is removably locked in connection therewith by engagement with lugs formed upon or in connection with the cylinder as at 12, 13 and 14.

The depending flange of the cover is suitably notched, as indicated in Fig. 4, to admit the lugs and engage therewith, forming a lock after the manner of a bayonet joint.

At 15 is a stationary hand-piece or lever, the same being riveted or otherwise secured upon the top or cover and through this project fulcrums 16 and 17 for application of the movable lever or hand-piece, the stationary part, 15, being slotted on both sides as indicated at 18 and 19.

20 is a movable lever fulcrumed upon the stationary piece 15 and carrying a pin, 23, mounted in the slots 18 and 19 and passing through a friction ratchet, 22, seated upon the piston 10 and acted upon by a spring, 21, between it and the cover.

The cover is provided with an elongated neck through which the piston rod 10 moves so that the latter is always accurately guided in its up and down movements.

The parts being constructed and mounted as so far indicated, by grasping the two handles or levers and forcing the lever 20 down towards the lever 15, the friction ratchet 22 will engage the piston rod 10 and compel it and the piston connected with it to move down. Then on releasing the grasp the upper lever and the friction ratchet will be carried back to their former positions by the action of the spring 21. Contact of the two levers limits the length of each downward stroke, so that if the two are brought together each time the device is operated, an equal amount of the material will be forced out of the central cylinder.

The lower portion of the central cylinder is somewhat contracted, as indicated, and it terminates in an open mouth, represented at 33. Through this mouth the material is ejected by the downward movements of the piston.

To cut off the material as it is ejected, I employ a fine wire, as at 24. This is mounted in a bent spring, 27, and its ends, 25 and 26, are secured in said spring preferably by soldering them in place. The spring 27 keeps the wire 24 always taut and therefore in good cutting condition. One end of the spring projects slightly so as to be within convenient reach of the hand and the other end is hinged in connection with the apparatus. Hinge lugs, as 28 and 29, are formed in connection with the spring and through these projects the hinge pin or axis, 30, the latter being secured in connection with the body of the apparatus, as by the securing nuts 31 and 32, these nuts being so packed as to prevent leakage through the opening which receives the hinge pin.

The legs 3, 4 and 5 are of sufficient length to elevate the lower portion of the device far enough above a table or other support to accommodate a bowl or plate for receiving the pieces or cakes as they are cut off.

A portion of the material being projected from the mouth 33 by one downward stroke of the lever 20, it is cut off by swinging the spring 27 so as to carry the cutting wire 24 past the open mouth and through the material, and the severed piece or cake drops down into the receptacle provided for receiving it.

To charge the device with material to be operated upon, the cover and the piston are removed and afterward replaced in a manner which will be readily understood.

The parts of the device may be easily cleaned and they are easy to construct, to assemble and to operate.

The material, while contained in the device, is kept free from dust and may be maintained at any temperature desired by attention to supplying the annular chamber with the necessary cooling mixture.

The device is mainly intended for operation in connection with butter but manifestly it could be employed to mold and cut lard or other material of like consistency.

Being constructed and arranged substantially in accordance with the foregoing explanations the improved device will be found to answer all the purqoses or objects of the invention hereinbefore alluded to.

Having now fully described my invention, what I claim as new herein and desire to secure by Letters Patent, is:

1. In a molder and cutter of the character described, the combination with the cylinder for containing the material to be molded and cut, of a piston and piston rod movable therein, a removable cover for said cylinder, a hand piece affixed to the cover, a friction ratchet for operating the piston rod, a hand lever for engaging said ratchet, and a spring applied between the cover and ratchet, substantially as explained.

2. In a molder and cutter of the character described, the combination with the two cylinders, of which the inner one is provided with an open mouth at the bottom, and means for forcing the material through said mouth, a space being left between the two cylinders, of a bent flexible spring, a cutting wire applied on the spring and held taut thereby, said spring having lugs, and a hinge pin secured in the base part of the apparatus between the two cylinders and packed in said base as explained, the hinge pin receiving the lugs on the spring and the spring being arranged to carry the wire past the open mouth of the inner cylinders, the parts being constructed and arranged substantially as shown and described.

3. The herein described molder and cutter comprising the two cylinders one of which has an open mouth at the bottom part, piston, piston rod, friction ratchet and means for operating the same, the removable cover, and means for cutting off the material projected from the said open mouth, the friction ratchet and its operating means being applied on the cover, the parts being constructed and arranged for operation substantially as shown and explained.

In testimony whereof I have signed my name to this specification in the presence of two subscribing witnesses.

ALBERT WILHELM WARD.

Witnesses:
C. SEDGWICK,
J. M. HOWARD.